United States Patent
Stock et al.

(10) Patent No.: US 10,200,524 B2
(45) Date of Patent: Feb. 5, 2019

(54) HAND-HELD TOOL SYSTEM

(71) Applicant: Robert Bosch GmbH, Stuttgart (DE)

(72) Inventors: Joern Stock, Wernau (DE); Florian Esenwein, Leinfelden-Echterdingen (DE); Joachim Schadow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/383,239

(22) Filed: Dec. 19, 2016

(65) Prior Publication Data

US 2017/0180536 A1 Jun. 22, 2017

(30) Foreign Application Priority Data

Dec. 21, 2015 (DE) .................. 10 2015 226 185

(51) Int. Cl.
| | | |
|---|---|---|
| H04M 1/725 | (2006.01) | |
| H04W 4/70 | (2018.01) | |
| H04W 4/80 | (2018.01) | |
| H04B 1/3827 | (2015.01) | |

(52) U.S. Cl.
CPC .......... H04M 1/7253 (2013.01); H04B 1/385 (2013.01); H04M 1/72533 (2013.01); H04W 4/70 (2018.02); H04W 4/80 (2018.02); H04B 2001/3855 (2013.01); H04B 2001/3861 (2013.01)

(58) Field of Classification Search
CPC ................................ B25F 5/00; H04M 1/7253
See application file for complete search history.

(56) References Cited

U.S. PATENT DOCUMENTS

| | | | | |
|---|---|---|---|---|
| 2006/0179473 A1* | 8/2006 | Innami | ...................... | B25F 5/00 726/2 |
| 2010/0180740 A1* | 7/2010 | Krapf | ................ | B23Q 11/0082 83/72 |
| 2010/0300256 A1* | 12/2010 | Loewe | ............... | B23Q 11/0082 83/72 |
| 2012/0169485 A1* | 7/2012 | Eckert | ..................... | B25B 21/00 340/13.25 |
| 2013/0187587 A1* | 7/2013 | Knight | ..................... | H02P 6/08 318/400.37 |
| 2014/0240125 A1* | 8/2014 | Burch | ................ | G08B 21/0213 340/539.13 |
| 2014/0259599 A1* | 9/2014 | Glaspell | ................. | B25B 21/00 29/407.04 |

(Continued)

FOREIGN PATENT DOCUMENTS

| | | |
|---|---|---|
| DE | 298 14 916 U1 | 12/1998 |
| DE | 20 2007 010 762 U1 | 11/2007 |

(Continued)

*Primary Examiner* — David Bilodeau

(74) *Attorney, Agent, or Firm* — Maginot, Moore & Beck LLP

(57) ABSTRACT

A hand-held tool system includes at least one mobile sensor device. The mobile sensor device has at least one base unit and at least one communication unit. The communication unit is configured to communicate with the hand-held power tool. The hand-held tool system further includes at least one function device configured to be detachably connected to the mobile sensor device such that a functionality of the mobile sensor device is expanded.

3 Claims, 4 Drawing Sheets

(56) References Cited

U.S. PATENT DOCUMENTS

| | | | | |
|---|---|---|---|---|
| 2015/0173616 A1* | 6/2015 | Zajac | ............ | H04Q 9/00 340/870.07 |
| 2015/0316913 A1* | 11/2015 | Rickey | ............ | G05B 15/02 700/180 |
| 2016/0261299 A1* | 9/2016 | Hosoi | ............ | G06F 1/163 |
| 2016/0314623 A1* | 10/2016 | Coleman | ............ | G02B 27/017 |
| 2016/0342142 A1* | 11/2016 | Boeck | ............ | B24B 55/00 |
| 2016/0375570 A1* | 12/2016 | Boeck | ............ | B24B 23/028 700/169 |
| 2017/0008159 A1* | 1/2017 | Boeck | ............ | B25F 5/00 |
| 2017/0011210 A1* | 1/2017 | Cheong | ............ | H04W 12/06 |
| 2017/0014984 A1* | 1/2017 | Rola | ............ | B25F 5/00 |
| 2017/0168462 A1* | 6/2017 | Ryu | ............ | G04G 17/02 |

FOREIGN PATENT DOCUMENTS

| | | |
|---|---|---|
| DE | 10 2009 027 587 A1 | 1/2011 |
| DE | 10 2014 209 009 A1 | 7/2015 |

\* cited by examiner

HAND-HELD TOOL SYSTEM

This application claims priority under 35 U.S.C. § 119 to patent application no. DE 10 2015 226 185.9 filed on Dec. 21, 2015 in Germany, the disclosure of which is incorporated herein by reference in its entirety.

BACKGROUND

A hand-held tool system, having at least one mobile sensor device that has at least one base unit having at least one communication unit designed to communicate with a hand-held power tool, has already been proposed.

SUMMARY

The disclosure is based on a hand-held tool system, having at least one mobile sensor device that has at least one base unit having at least one communication unit designed to communicate with a hand-held power tool.

It is proposed that the hand-held tool system has at least one function device that can be detachably connected to the mobile sensor device for the purpose of expanding a functionality of the mobile sensor device. Preferably, the function device is designed to optionally expand a functionality of the mobile sensor device. The mobile sensor device can also be used, in particular, without the function device. Particularly preferably, the function device is realized such that it can be detachably connected to the sensor device without the use of a tool. Preferably, the mobile sensor device is of, in particular, a modular construction, and can be connected to a function device for operation with a hand-held power tool.

Preferably, the mobile sensor device comprises the communication unit, as well as a sensor system for exchanging data with the hand-held power tool. Preferably the mobile sensor device has an interface, for fastening the mobile sensor device to, for example, the operator, work clothing, a PSA, an arm-band or a hand-held power tool, by means of plugging-in, latching, clipping, screw connection, tying or the like. The mechanical interface in this case may also have, in addition to the fixing, electrical contacts that can be used, for example, for transmitting data and/or energy.

A "hand-held tool system" in this context is to be understood to mean, in particular, a system for and/or having a hand-held power tool. Preferably, it is to be understood to mean, in particular, a system that is designed, at least, for use with a hand-held power tool. Particularly preferably, it is to be understood to mean, in particular, a system designed for direct communication with a hand-held power tool. A "hand-held power tool" in this case is to be understood to mean, in particular, a machine for performing work on workpieces, but advantageously a power drill, a hammer drill and/or percussion hammer, a saw, a plane, a screwdriver, a router, a sander, an angle grinder, a garden appliance and/or a multifunction tool.

Moreover, a "mobile sensor device" in this context is to be understood to mean, in particular, a sensor device designed to be worn by a user during operation. Wearing in this case may be effected both directly, such as, in particular, in a hand of the operator, or indirectly, such as, in particular, by means of an item of clothing worn by an operator and/or by means of an appliance held by an operator. Preferably, the mobile sensor device comprises an energy storage means such as, in particular, a storage battery, for supplying electrical power during mobile operation. Preferably, the mobile sensor device is realized as a wearable computer, considered appropriate by persons skilled in the art, such as, for example, as a part of a smartwatch and/or a smartband. A "sensor device" in this case is to be understood to mean, in particular, a device that comprises at least one sensor. A "sensor" in this context is to be understood to mean, in particular, a unit provided to pick up at least one characteristic quantity and/or a physical characteristic, the pick-up being able to be effected actively, such as, in particular, by generating and emitting an electrical measuring signal, and/or passively, such as, in particular, by sensing changes in a characteristic of a sensor component. Various sensors, considered appropriate by persons skilled in the art, are conceivable. Furthermore, a "base unit" in this context is to be understood to mean, in particular, a unit that is designed to provide the basic functions of the mobile sensor device. Preferably, the base unit constitutes a basic module of the mobile sensor device that, in particular considered individually, is capable of functioning. Particularly preferably, the base unit comprises a computing unit that is designed to control the mobile sensor device. A "computing unit" in this case is to be understood to mean, in particular, a unit having an information input, an information processing system and an information output. Advantageously, the computing unit has at least one processor, a storage memory, input and output means, further electrical components, an operating program, closed-loop control routines, open-loop control routines and/or calculation routines. Preferably, the components of the computing unit are disposed on a common printed circuit board and/or, advantageously, disposed in a common housing. Moreover, a "communication unit" in this context is to be understood to mean, in particular, a unit designed to provide, in particular cordless, communication with the hand-held power tool. Preferably, for the purpose of communicating with the hand-held power tool, the communication unit has at least one interface. Preferably, a communication unit is to be understood to mean, in particular, a unit designed for exchanging data. In particular, the communication unit has at least one information input and at least one information output.

Preferably, the communication unit has at least two information inputs and at least two information outputs, at least one information input and at least one information output in each case being designed for connection to a physical system, in particular the hand-held power tool. Particularly preferably, it is to be understood to mean an interface between at least two physical systems, such as, in particular, between the hand-held power tool and the mobile sensor device. Various communication units, considered appropriate by persons skilled in the art, are conceivable, but in particular this is to be understood to mean a wireless interface such as, for example, Bluetooth, in particular according to the Standard 4.0 Low Energy, WLAN, in particular according to the Standard 801.11n, Zigbee, NFC, RFID, GSM, LTE or UMTS, and/or a wire-bound interface such as, for example, a USB connection, a Canbus interface, an Ethernet interface, in particular having twisted-pair cables (CAT5 or CAT6), an optical interface, a KNX interface and/or a powerline interface.

"Detachably" in this context is to be understood to mean, in particular, "non-destructively separable". Moreover, a "function device" in this context is to be understood to mean, in particular, a device designed to expand a functionality of the mobile sensor device. Preferably, it is to be understood to mean, in particular, a device designed to provide an additional utility and/or an improved use for the mobile sensor device. Preferably, it is to be understood to mean, in particular, a device by means of which the mobile sensor device is advantageously expanded, in particular in respect of its functionality and/or usability. Particularly preferably, it is to be understood to mean, in particular, a device by means of which an operator can advantageously use the mobile sensor device, in particular in an application. Various expanded functionalities, considered appropriate by persons skilled in the art, are conceivable, such as, for example, an expanded sensing of characteristic quantities, an improvement of a robustness of the hand-held tool system and/or the improvement of convenience of wear or attachment capability of the mobile sensor device. "Designed" is to be understood to mean, in particular, specially programmed, configured and/or equipped. That an object is designed for a particular function is to be understood to mean, in particular, that the object fulfils and/or executes this particular function in at least one application state and/or operating state.

The design of the hand-held tool system according to the disclosure advantageously enables a functionality of the mobile sensor device to be achieved. Preferably, this makes it possible, in particular, to provide an advantageously variable hand-held tool system, in particular an advantageously variable mobile sensor device. Particularly preferably, this makes it possible to achieve modularity of the hand-held tool system. In particular, differing mobile sensor devices and differing function devices can be combined in an advantageous manner. The hand-held tool system can be constructed in the manner of a modular system. This additionally makes it possible to provide an individually adapted sensor device. For this purpose, for example, the sensor device can be taken, as a modular element, from a hand-held power tool and detachably connected to a function device. In addition, the modular structure of the hand-held tool system enables the mobile sensor device to be integrated in a modular manner into a variety of items of work equipment such as, for example, into work clothing, PSAs, electric tools, arm-bands or other items of equipment considered appropriate by persons skilled in the art.

It is additionally proposed that that the at least one function device has at least one housing unit that is designed to accommodate the mobile sensor device. Preferably, the at least one housing unit of the function device is designed to constitute an additional housing of the mobile sensor device. Preferably, the housing unit is designed to improve protection and/or robustness of the mobile sensor device. A "housing unit" in this context is to be understood to mean, in particular, a unit designed for additional protection of the mobile sensor device. Preferably, it is to be understood to mean, in particular, a unit designed to at least partly encompass the mobile sensor device. Various designs of the housing unit, considered appropriate by persons skilled in the art, are conceivable, but preferably the housing unit is realized as an optional protective cage and/or as an optional watertight housing for the mobile sensor device. A protective cage enables the mobile sensor device to be protected in a particularly effective manner against shocks, impacts, mechanical wear, water, chemicals or the like. "At least partly encompass" in this case is to be understood to mean, in particular, that an encompassed device is encompassed by the housing unit, in at least one plane, in an angular range of at least 90°, preferably of at least 120°, and particularly preferably of at least 180°. This makes it possible, in particular, to provide an advantageously variable hand-held tool system, in particular an advantageously variable mobile sensor device. Particularly preferably, this enables a modular-type structure of the hand-held tool system to be provided. Moreover, advantageously, this enables protection and/or robustness of the mobile sensor device to be improved. Preferably, protection and/or robustness of the mobile sensor device can be adapted to the application.

Furthermore, it is proposed that the at least one function device has at least one fastening unit that is designed to fasten the mobile sensor device to an extremity of an operator. Preferably, the fastening unit is designed to fasten the mobile sensor device to an arm, in particular to a wrist, of an operator. A connection between the mobile sensor device and the fastening unit may be effected, in particular, directly or indirectly, such as, for example, by means of the housing unit of the function device. A "fastening unit" in this context is to be understood to mean, in particular, a unit provided to fasten the mobile sensor device to an operator.

Preferably, it is to be understood to mean, in particular, a unit realized such that it can be detachably connected to the mobile sensor device and at the same time detachably connected to an operator. Various fastening units, considered appropriate by persons skilled in the art, are conceivable. This makes it possible to provide, in particular, an advantageously variable hand-held tool system, in particular an advantageously variable mobile sensor device. Particularly preferably, this enables a modular-type hand-held tool system to be provided. Moreover, advantageously, this enables the mobile sensor device to be disposed in a manner that is adapted to current circumstances and/or to an operator's requirement. Preferably, differing dispositions of the same mobile sensor device can thus be realized on an operator.

It is additionally proposed that the at least one fastening unit be realized, at least partly, as an arm-band. Preferably, the fastening unit is realized, at least partly, as a silicone arm-band. The arm-band in this case may be realized both such that it in itself is fully closed in the circumferential direction, and closed by means of a further unit such as, for example, the housing unit of the function device. Preferably, the arm-band serves, in particular, to be directly fastened to an extremity, in particular an arm, of an operator. In particular, this enables the mobile sensor device to be disposed in a reliable manner on an operator. Preferably, this also advantageously enables differing mobile sensor devices to be disposed on an operator. Particularly preferably, this enables a modular-type hand-held tool system to be provided.

It is further proposed that the at least one fastening unit of the function device comprises an at least partly elastic receiving region, for receiving the mobile sensor device. Preferably, the receiving region is composed, at least partly, of silicone. A "receiving region" in this context is to be understood to mean, in particular, a material sub-region of the fastening unit that is designed to directly accommodate the mobile sensor device. Preferably, the receiving region is designed to at least partly encompass the mobile sensor device when the latter has been received therein. Preferably, when the mobile sensor device has been received therein, it is held captively in the receiving region. "At least partly encompass" in this case is to be understood to mean, in particular, that an encompassed device is encompassed by the receiving region, in at least one plane, in an angular range of at least 90°, preferably of at least 120°, and particularly preferably of at least 180°. Moreover, an "at least partly elastic receiving region" in this context is to be understood to mean, in particular, a receiving region that has a low modulus of elasticity in a sub-region, preferably in at least one sub-region that is at least 20%, preferably at least 40%, and particularly preferably at least 60% of the receiving region. Preferably, a material of the sub-region of the receiving region has a low modulus of elasticity. A "low modulus of elasticity" in this case is to be understood to mean, in particular, a modulus of elasticity of less than 10 N/mm$^2$, preferably of less than 1 N/mm$^2$, and particularly preferably of less than 0.1 N/mm$^2$, at a temperature of 20° C. This enables the mobile sensor device to be connected to, and detached from, the fastening unit in an advantageously rapid and simple manner. The mobile sensor device and/or the fastening unit can be replaced rapidly and easily. Particularly preferably, this enables an advantageously modular-type hand-held tool system to be provided.

It is additionally proposed that the at least one function device has at least one receiving region for receiving at least one optional sensor unit, which is designed to be connected to the mobile sensor device. Preferably, the optional sensor unit is designed for data connection to the mobile sensor device. Particularly preferably, the optional sensor unit is designed for wireless data connection to the mobile sensor device. An "optional sensor unit" in this context is to be understood to mean, in particular, a sensor unit that is designed for functional expansion of the mobile sensor device, but that is not required for basic operation of the mobile sensor device. A "sensor unit" in this case is to be understood to mean, in particular, a unit that comprises at least one sensor. Preferably, the sensor unit is designed only for acquisition of data of the sensor. Evaluation of the data of the sensor is preferably effected by the mobile sensor device. The mobile sensor device can thus be expanded by an optional sensor device in an advantageously simple manner. The hand-held tool system can thus be adapted, advantageously, to an operator and/or to current requirements. Preferably, a modular-type structure of the hand-held tool system can be achieved. Moreover, the optional sensor device can thus be mounted in an advantageously simple manner. The arm-band is thus preferably able to accommodate differing types of sensor, which can be exchanged according to the field of application and/or an operator's requirement. Moreover, it is also conceivable that, in addition or as an alternative to the ability to exchange the sensor unit, it is possible to attach additional sensor modules, communication elements, output elements, such that the mobile sensor device can be adapted to individual requirements and/or environmental conditions, and/or expanded.

Furthermore, it is proposed that the at least one mobile sensor device has at least one receiving region for receiving at least one optional sensor unit. Preferably, the receiving region has at least one data interface for data connection between the base unit and the optional sensor unit. The mobile sensor device can thus be expanded in an advantageously simple manner by an optional sensor unit. This enables the hand-held tool system to be adapted, advantageously, to an operator and/or current requirements. Preferably, a modular-type structure of the hand-held tool system can be achieved. In addition, a secure data connection can be achieved between the optional sensor unit and the mobile sensor device, in particular independently of the function device.

The disclosure is additionally based on a mobile sensor device for a hand-held tool system. It is proposed that the mobile sensor device has at least one operating unit that is designed to control the base unit, at least partly. An "operating unit" is to be understood to mean, in particular, a unit having at least one component that can be actuated directly by an operator, and which is designed to influence and/or change a process and/or a state of a unit coupled to the operating unit as a result of an actuation and/or an input of parameters. Preferably, for this purpose, the operating unit has, in particular, at least one operating element. An "operating element" in this case is to be understood to mean, in particular, an element designed to receive an input quantity from an operator in an operating operation and, in particular, to be contacted directly by an operator, wherein touching of the operating element is sensed, and/or an actuating force exerted upon the operating element is sensed and/or transferred mechanically for the purpose of actuating a unit. In particular, advantageously, a high degree of operating convenience can thus be achieved.

Additionally proposed is a hand-held power tool having at least one receiving region that is designed to directly receive a mobile sensor device. This makes it possible, in particular, for the mobile sensor device to be disposed in an advantageous manner. Preferably, an advantageous transport disposition of the mobile sensor device can thus be achieved. Moreover, in addition, this also makes it possible to achieve functional expansion of the hand-held power tool. In particular, the hand-held power tool can be expanded by the sensors of the mobile sensor device. This makes it possible for the mobile sensor device to be made handily available to an operator in the case of work stages, such that the operator, in addition to his work tasks, does not also have to think about the sensor device, in order thus to achieve the greatest possible utilization of the sensor device. It is also conceivable for the mobile sensor device to be realized such that it can be integrated in an accessory part, or disposed on the latter, such that an operator has the mobile sensor device ready to hand when using the hand-held power tool or the accessory.

The disclosure is additionally based on a method for operating the hand-held tool system. It is proposed that the mobile sensor device be coupled to the function device depending on an operating state. Preferably, a type of the function device is selected depending on an operating state. In particular, differing function devices may be coupled to the mobile sensor device. This makes it possible to provide, in particular, an advantageously variable hand-held tool system, in particular an advantageously variable mobile sensor device. Particularly preferably, it is possible to provide an advantageous capability to combine a different mobile sensor device and a different function device. In particular, the function device in this case can be selected depending on an operating state.

It is furthermore proposed that differing settings be stored on the mobile sensor device depending on a field of application. Preferably, differing settings are stored on the mobile sensor device depending on a work activity and/or a hand-held power tool. Various settings, considered appropriate by persons skilled in the art, and that are stored on the mobile sensor device, are conceivable, such as, in particular, which characteristic quantities and/or parameters are to be monitored during operation, and/or calibration data of the at least one sensor of the mobile sensor device that are matched to an application. This makes it possible, in particular, for the hand-held tool system to be used in an advantageously simple manner for differing work activities and/or hand-held power tools.

It is additionally proposed that the settings be automatically stored on the mobile sensor device by the hand-held power tool by means of pairing. "Pairing" in this context is to be understood to mean, in particular, establishment of a preferably wireless data connection between at least two appliances. Conceivable in this case, in particular, are various data connections considered appropriate by persons skilled in the art, such as, for example, by means of Bluetooth, in particular according to the Standard 4.0 Low Energy, by means of WLAN, in particular according to the Standard 801.11n, by means of Zigbee, by means of NFC, by means of RFID, by means of GSM, by means of LTE or by means of UMTS. Preferably, an operator can store differing settings on the mobile sensor device for each work activity and/or hand-held power tool. Particularly preferably, however, following pairing with the hand-held power tool, all settings are also automatically transmitted to the mobile sensor device and the hand-held power tool is set accordingly. It is also conceivable, in a further embodiment, for the mobile sensor device to be fixedly paired with the hand-held power tool. In this case, a user can preferably only put the hand-held power tool into operation if the sensor device is being worn and, for example, a safe standing position, wearing of the arm-band or the like, is identified. If, during operation, the mobile sensor device identifies, for example, a fall or other incidents that limit the operation of the hand-held power tool, then, for example, an emergency switch-off of the hand-held power tool can be effected.

The hand-held tool system, the mobile sensor device, the function device, the hand-held power tool and the method according to the disclosure in this case are not intended to be limited to the application and embodiment described above. In particular, the hand-held tool system, the mobile sensor device, the function device, the hand-held power tool and the method according to the disclosure may have individual elements, components and units that differ in number from a number stated herein, in order to fulfill a principle of function described herein.

BRIEF DESCRIPTION OF THE DRAWINGS

Further advantages are disclosed by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
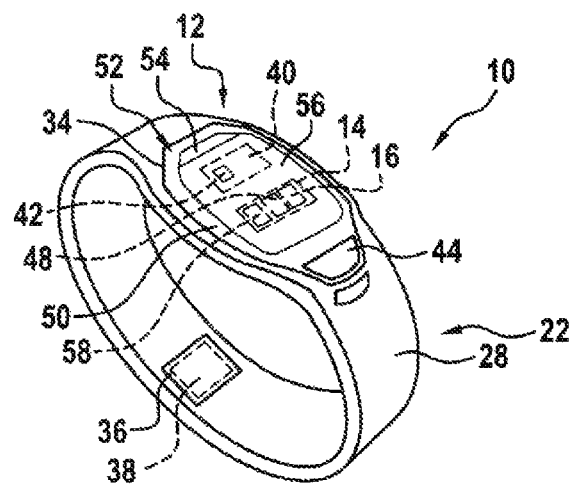
FIG. 1 illustrates a hand-held tool system with a mobile sensor device and with a function device in a connected state, in a schematic representation.
Figure 6:
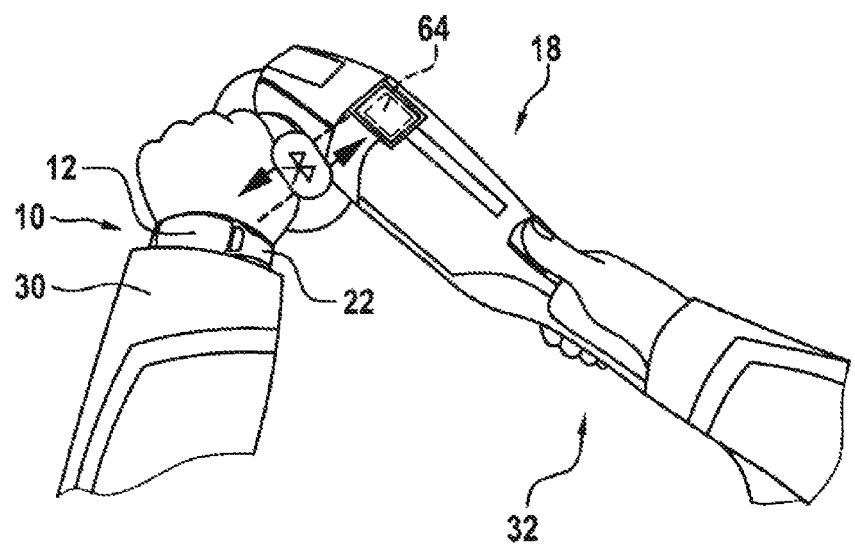
FIG. 6 illustrates the hand-held tool system and a hand-held power tool during operation, in a schematic representation.

FIG. 1 shows a hand-held tool system 10. The hand-held tool system 10 is realized such that it can be disposed on a part of the body of an operator 32, in particular on an extremity 30 of the operator 32 (FIG. 6). The hand-held tool system 10 is realized as a function device that can be disposed on an extremity 30 of the operator 32. The hand-held tool system 10 is realized as a smartband. The mobile sensor device 12 is preferably realized such that it can be disposed on an arm of an operator 32 (FIG. 6).

The hand-held tool system 10 has a mobile sensor device 12. The mobile sensor device 12 has a housing 50. The housing 50 is constituted by a plastic housing. In principle, however, another design, considered appropriate by persons skilled in the art, would also be conceivable. The mobile sensor device 12 additionally has a base unit 14. The base unit 14 is disposed in the housing 50 of the mobile sensor device 12. The base unit 14 constitutes a base module of the mobile sensor device 12. The base unit 14 of the mobile sensor device 12 has a computing unit 48. The computing unit 48 comprises a processor, a storage memory and an operating program. The computing unit 48 serves to control the mobile sensor device 12.

The mobile sensor device 12 additionally has an operating unit 44. The operating unit 44 is designed to partly control the base unit 14. The operating unit 44 serves, for example, to change modes and/or an acknowledgement button. The operating unit 44 has an operating key that projects out of an opening in the housing 50. In principle, however, a different design, and/or different number of operating elements of the operating unit 44, considered appropriate by persons skilled in the art, would be conceivable. Furthermore, the mobile sensor device 12 has a display unit 52. The display unit 52 is disposed in the housing 50. The display unit 52 has a status light 54 that projects out of an opening in the housing 50. By means of differing light signals, such as colors, flash frequencies, pulsing light signals, brightnesses, running lights or the like, the status light 54 can output differing items of information to an operator 32. Communication with an operator 32 can be effected by means of the status light 54. The display unit 52 additionally has a display 56, which likewise projects out of an opening in the housing 50. Differing means of communication such as, for example, symbols, text, numbers, images and videos can be output to an operator 32 by means of the display 56. In principle, it would also be conceivable for the display 56 additionally to constitute a part of the operating unit 44. For this purpose, it would be conceivable for the display 56 to be realized as a touchscreen. This would also make it possible, in particular, to dispense with an additional operating key.

The base unit 14 additionally comprises a sensor unit 58. The sensor unit 58 is connected to the computing unit 48 of the base unit 14. The sensor unit 58 is designed to sense at least one operator-specific characteristic quantity and/or at least one orientation-specific characteristic quantity. The sensor unit 58 is designed to sense vital data of the operator 32 and/or ambient characteristic quantities of the sensor unit 58. The sensor unit 58 is designed to identify and sense working states and/or vital data. For this purpose, the sensor unit 58 may have various types of sensor. Preferably, the sensor unit 58 has an orientation sensor such as, in particular, a magnetic field sensor for sensing an orientation in space, a movement sensor, in particular for sensing a velocity, an acceleration and/or a rotation rate, a GPS sensor, in particular for sensing the X, Y and Z coordinates in relation to a ground surface, a pressure sensor such as, in particular, a strain gauge, a gas sensor, in particular for sensing a $CO_2$ or carbon monoxide component in an ambient air, a rotation rate sensor, a temperature sensor, in particular for sensing a body and/or ambient temperature, a voltmeter, a humidity sensor, a pH-value sensor, an air-pressure sensor such as, in particular, a barometer, and/or a pulse meter. The sensor unit 58 may therefore be designed, for example, to sense data of a behavior of the operator 32, and/or an operating burden, for example in the form of a noise burden and/or a vibration burden, a pulse of an operator 32, a body temperature of an operator 32, a characteristic quantity of fatigue of an operator 32, an orientation characteristic quantity, and/or a movement characteristic quantity such as, in particular, accelerations. In addition, the sensor unit 58 may also be designed to monitor a pulse of the operator 32. Data of an operator 32 are additionally stored on the storage memory of the computing unit 48. Personal data such as, for example, a weight, age, BMI, medical record or the like of the operator 32 are stored on the storage memory of the computing unit 48. Preferably, it is possible to determine from the sensed data and the stored personal data, for example, what is a healthy pulse and when the pulse attains a critical value for the operator 32. For this purpose, the sensor unit 58 can determine the pulse of the operator 32, for example, over the working day.

The base unit 14 additionally has a communication unit 16. The communication unit 16 is disposed in the housing 50. Furthermore, the communication unit 16 is electrically connected to the computing unit 48. The communication unit 16 is designed to communicate with a hand-held power tool 18, 18', 18". The communication unit 16 is designed to establish a data connection between a hand-held power tool 18, 18', 18" and the mobile sensor device 12. Data of the computing unit 48, for controlling the hand-held power tools 18, 18', 18", and/or data of the sensor unit 58 such as, in particular, measurement results, can be transmitted to the hand-held power tool 18, 18', 18" via the communication unit 16. The hand-held power tool 18, 18', 18", in turn, can use the data of the computing unit 48 and/or the data of the sensor unit 58 to adapt operating parameters and/or safety settings of the hand-held power tool 18, 18', 18". The communication unit 16 has a wireless interface. The wireless interface is constituted by a Bluetooth interface, in particular according to the Standard 4.0 Low Energy. In principle, however, a different interface, considered appropriate by persons skilled in the art, is also conceivable, such as, for example, a WLAN interface, in particular according to the Standard 801.11n, a Zigbee interface, an NFC interface, an RFID interface, a GSM interface, an LTE interface and/or a UMTS interface. The communication unit 16 additionally has a wire-bound interface. The wire-bound interface is constituted by a USB connection. In principle, however, a different design of the wire-bound interface, considered appropriate by persons skilled in the art, is also conceivable. The wire-bound interface is designed to connect the mobile sensor device 12 to an external device such as, in particular, a computer. Data can be loaded onto the mobile sensor device 12 via the wire-bound interface. In addition, the wire-bound interface can be used to charge an energy storage means of the mobile sensor device 12.

In addition, via the communication unit 16, the mobile sensor device 12 can also form a network with its environment and exchange information and/or data with an environment. It is also possible to implement with the operator 32 a modular, device-related authorization management that, on the one hand, significantly increases safety and that, owing to the modular design, can also be produced at low cost and be used in many products, in order to achieve a high market penetration. In addition to communicating with the hand-held power tool 18, 18', 18", therefore, the mobile sensor device 12 can also communicate with further elements in the environment, such as, for example, work clothing, a garden appliance, an indoor infrastructure element such as, in particular, a smoke alarm and/or an access control, and/or an outdoor infrastructure element such as, in particular, a turnstile. For the purpose of communicating with the element, or the environment, the communication unit 16, in addition to having a wireless interface, may also have a wire-bound interface such as, in particular, a USB interface, a Canbus interface, an Ethernet interface, in particular having twisted-pair cables (CAT5 or CAT6), an optical interface, a KNX interface and/or a powerline interface.

Furthermore, the mobile sensor device 12 has a receiving region 40 for receiving an optional sensor unit 42. The mobile sensor device 12 can be expanded by the optional sensor unit 42. Depending on the application, optional sensor units 42, having differing sensors, can be inserted in the receiving region 40 in order to adapt the mobile sensor device 12 to a respective application. The receiving region 40 is integrated into the housing 50. The receiving region 40 is accessible from outside the housing 50. Furthermore, the receiving region 40 has a data interface, not shown further, for a data connection between the base unit 14 and the optional sensor unit 42. Preferably, the optional sensor unit 42 has an orientation sensor such as, in particular, a magnetic field sensor, for sensing an orientation in space, a movement sensor, for sensing a velocity, an acceleration and/or a rotation rate, a GPS sensor, in particular for sensing the X, Y and Z coordinates in relation to a ground surface, a pressure sensor such as, in particular, a strain gauge, a gas sensor, in particular for sensing a $CO_2$ or carbon monoxide component in an ambient air, a rotation rate sensor, a temperature sensor, in particular for sensing a body and/or ambient temperature, a voltmeter, a humidity sensor, a pH-value sensor, an air-pressure sensor such as, in particular, a barometer, and/or a pulse meter.

The hand-held tool system 10 additionally has at least one function device 20, 22, which can be detachably connected to the mobile sensor device 12, for the purpose of expanding a functionality of the mobile sensor device 12. In the exemplary embodiment, two differing function devices 20, 22 are represented as examples. However, only one function device 20, 22 is required for a hand-held tool system 10. The mobile sensor device 12 can be freely combined with the function device 20, 22. An operator 32 can select a suitable function device 20, 22 for the mobile sensor device 12 according to a planned application. Various function devices 20, 22, considered appropriate by persons skilled in the art, are conceivable.

Of the function devices 20, 22, a function device 22 has a fastening unit 28. The fastening unit 28 is designed to fasten the mobile sensor device 12 to an extremity 30 of an operator 32. The fastening unit 28 is designed to fasten the mobile sensor device 12 to an arm, in particular to a wrist, of an operator 32. The fastening unit 28 is realized, at least partly, as an arm-band. The fastening unit 28 is realized as an arm-band. The fastening unit 28 is realized so as to be elastic. The fastening unit 28 is realized as a silicone arm-band. The fastening unit 28 is realized so as to be fully closed in the circumferential direction. The fastening unit 28 can be slipped over the hand of the operator 32, in order to be disposed on an arm of the operator 32. The fastening unit 28 is designed to be fastened directly to an extremity 30, in particular, the arm, of an operator 32. However, different designs of the fastening unit 28, considered appropriate by persons skilled in the art, are also conceivable, such as, for example, as an ankle-band, ring, glove or chest belt (FIG. 6).

Figure 2:
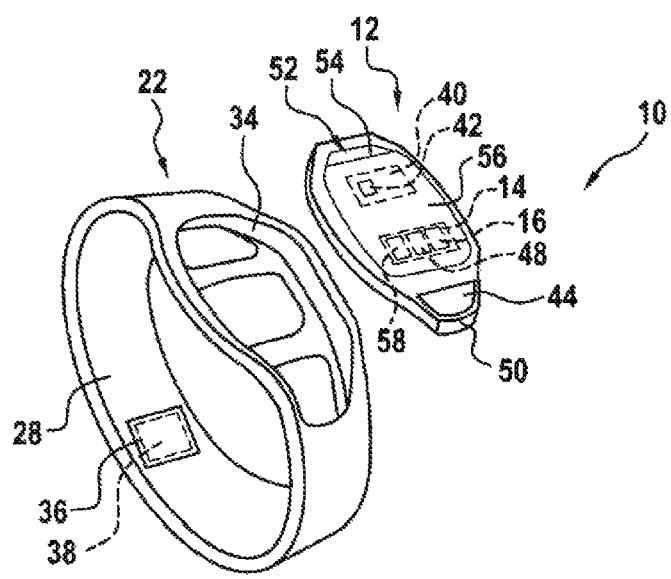
FIG. 2 illustrates a hand-held tool system with the mobile sensor device and with the function device in a detached state, in a schematic exploded representation.

The fastening unit 28 of the function device 22 additionally comprises a partly elastic receiving region 34, for receiving the mobile sensor device 12. The receiving region 34 is integrated into the arm-band. The receiving region 34 is composed of a silicone. The receiving region 34 is designed to at least partly to encompass the mobile sensor device 12 when the latter has been received therein. When having been received therein, the mobile sensor device 12 is held captively in the receiving region 34. The mobile sensor device 12 is held captively in the receiving region 34 by the elasticity of the receiving region 34. The mobile sensor device 12 can be removed from, and inserted in, the receiving region 34 without the use of a tool. The mobile sensor device 12 can be partly protected against shocks by means of the function device 22. Moreover, owing to the function device 22, a high degree of wearing convenience can be achieved (FIG. 2).

Furthermore, the function device 22 has a receiving region 36, for receiving an optional sensor unit 38 that is designed to be connected to the mobile sensor device 12. The receiving region 36 is integrated into the fastening unit 28 of the function device 22. The receiving region 36 is integrated into the arm-band. The receiving region 36 is composed of a silicone. The receiving region 36 is designed to at least partly encompass the optional sensor unit 38 when the latter has been received therein. The mobile sensor device 12 can be expanded by the optional sensor unit 38. Depending on an application, optional sensor units 38, having differing sensors, can be inserted in the receiving region 36 in order to adapt the mobile sensor device 12 to a respective application. The optional sensor unit 38 is designed for wireless data connection to the mobile sensor device 12. Transmission of data may be effected, for example, by means of an NFC interface. The optional sensor unit 38 in this case is designed only to acquire data of the at least one sensor of the optional sensor unit 38. Evaluation of the data of the at least one sensor is effected by the mobile sensor device 12. Preferably, the optional sensor unit 38 has an orientation sensor such as, in particular, a magnetic field sensor, for sensing an orientation in space, a movement sensor, for sensing a velocity, an acceleration and/or a rotation rate, a GPS sensor, in particular for sensing the X, Y and Z coordinates in relation to a ground surface, a pressure sensor such as, in particular, a strain gauge, a gas sensor, in particular for sensing a $CO_2$ or carbon monoxide component in an ambient air, a rotation rate sensor, a temperature sensor, in particular for sensing a body and/or ambient temperature, a voltmeter, a humidity sensor, a pH-value sensor, an air-pressure sensor such as, in particular, a barometer, and/or a pulse meter.

Figure 4:
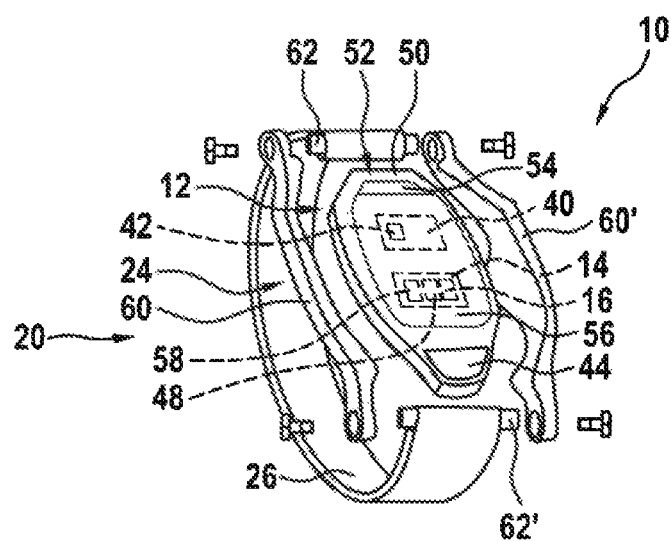
FIG. 4 illustrates the hand-held tool system with the mobile sensor device and with the alternative function device in a detached state, in a schematic exploded representation.
Figure 5:
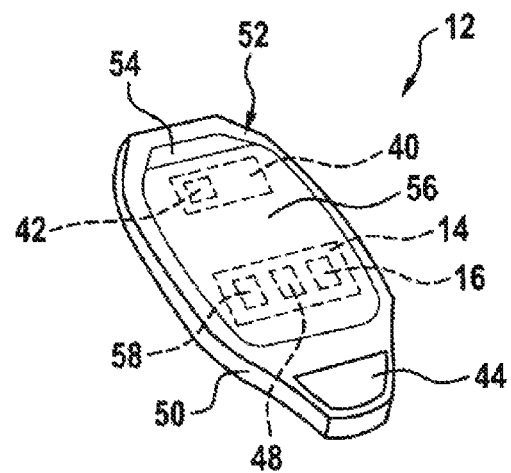
FIG. 5 illustrates the mobile sensor device of the hand-held tool system in a schematic representation.

Of the function devices 20, 22, an alternative function device 20 has a housing unit 24. The housing unit 24 serves to receive the mobile sensor device 12. The housing unit 24 serves to additionally protect the mobile sensor device 12. The housing unit 24 of the alternative function device 20 is designed to constitute an additional housing of the mobile sensor device 12. The housing unit 24 is designed to improve protection and robustness of the mobile sensor device 12. The housing unit 24 is realized as a protective cage. In principle, however, a different design of the housing unit 24, considered appropriate by persons skilled in the art, would also be conceivable, such as, for example, as a watertight housing. The housing unit 24 has two frame elements 60, 60'. The frame elements 60, 60' are made of a metal. In principle, however, a different material of the frame elements 60, 60' would also be conceivable. The frame elements 60, 60' are each designed, when having been connected to the mobile sensor device 12, to bear against two opposing lateral edges of the housing 50 of the mobile sensor device 12. An inner contour of the frame elements 60, 60' corresponds, at least partly, to an outer contour of the mobile sensor device 12. When the alternative function device 20 is in a mounted state, the frame elements 60, 60' are respectively connected, at opposite ends of the frame elements 60, 60', via two connecting links 62, 62'. The frame elements 60, 60' are each connected to the connecting links 62, 62'. When having been connected to the mobile sensor device 12, the connecting links 62, 62' are each disposed above and below the mobile sensor device 12. For the purpose of making a connection between the function device 20 and the mobile sensor device 12, at least one of the frame elements 60, 60' must be detached from the connecting links 62, 62' (FIG. 4).

The alternative function device 20 additionally has a fastening unit 26. The fastening unit 26 is designed to fasten the mobile sensor device 12 to an extremity 30 of an operator 32. The fastening unit 26 is designed to fasten the mobile sensor device 12 to an arm, in particular to a wrist, of an operator 32. The fastening unit 26 is realized, at least partly, as an arm-band. The fastening unit 26 is realized as an arm-band. The fastening unit 26 is realized so as to be elastic. The fastening unit 26 is realized as a textile arm-band. The fastening unit 26 is realized so as to be closed in the circumferential direction by means of the housing unit 24.

Figure 3:
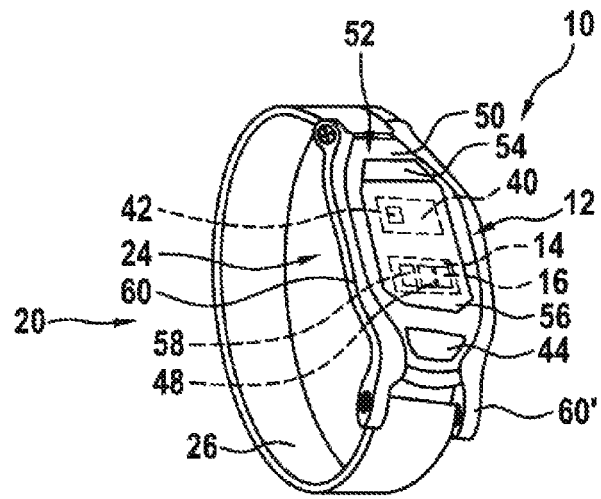
FIG. 3 illustrates the hand-held tool system with the mobile sensor device and with an alternative function device in a connected state, in a schematic representation.

The fastening unit 26 is fastened, by each of the ends, to the connecting links 62, 62' of the housing unit 24. The fastening unit 26 additionally has a closure, not shown further, by means of which the hand-held tool system 10 can be removed from an arm of the operator 32 and fastened to an arm of the operator 32. The fastening unit 26 is designed to be directly fastened to an extremity 30, in particular the arm, of an operator 32 (FIGS. 3, 4).

The hand-held tool system 10 can be used with differing hand-held power tools 18, 18', 18". In FIG. 6, the hand-held power tool 18 is realized, exemplarily, as an angle grinder. However, other realizations are also conceivable. The hand-held tool system 10 is designed to communicate with the hand-held power tool 18 via the communication unit 16 of the mobile sensor device 12. For the purpose of communicating with the mobile sensor device 12, the hand-held power tool 18 likewise has a communication unit 64. The communication unit 64 has a wireless interface. The wireless interface is constituted by a Bluetooth interface, in particular according to the Standard 4.0 Low Energy. Data of the computing unit 48 for controlling the hand-held power tool 18, and/or data of the sensor unit 58, such as, in particular, measurement results, can be transmitted to the hand-held power tool 18 via the communication units 16, 64. The hand-held power tool 18, in turn, can use the data of the computing unit 48 and/or the data of the sensor unit 58 to adjust operating parameters and/or safety settings of the hand-held power tool 18. This enables operation of the hand-held power tool 18 to be adapted, advantageously, to a state of the operator 32.

Figure 7:
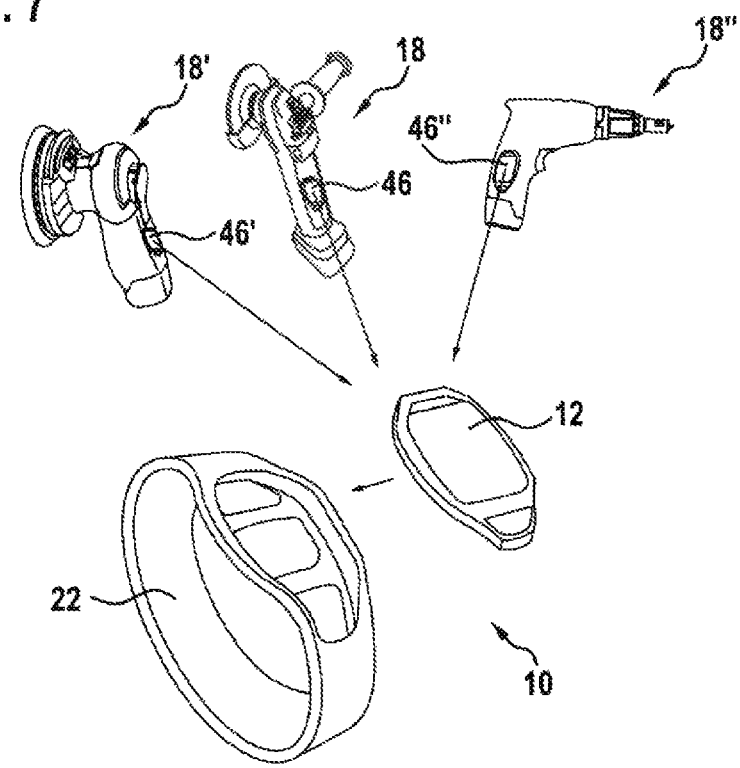
FIG. 7 illustrates the hand-held tool system with the mobile sensor device and with the function device and differing hand-held power tools, in a schematic representation.

Further hand-held power tools 18', 18" are represented in FIG. 7. A second hand-held power tool 18' in this case is realized as an orbital-action sander. A third hand-held power tool 18" in this case is realized as a battery-powered screwdriver. The hand-held power tools 18, 18', 18" have a respective receiving region 46, 46', 46" that is designed to directly receive a mobile sensor device 12 of the hand-held tool system 10. The sensor device 12 can be integrated into each of the hand-held power tools 18, 18', 18". In principle, it would also be conceivable for the entire hand-held tool system 10 to be realized such that it can be integrated into each of the hand-held power tools 18, 18', 18". The receiving region 46, 46', 46" of the hand-held power tools 18, 18', 18" is in each case realized as a storage compartment on the outside of the respective hand-held power tool 18, 18', 18". Alternatively, the mobile sensor device 12 may also be fastened, for example, to a wrist strap, a clip or the like of the hand-held power tool 18, 18', 18". The mobile sensor device 12 can be disposed both for storage in the receiving region 46, 46', 46" of the hand-held power tools 18, 18', 18" and during operation. During operation, the mobile sensor device 12 serves to expand a sensor system of the hand-held power tools 18, 18', 18".

Figure 8:
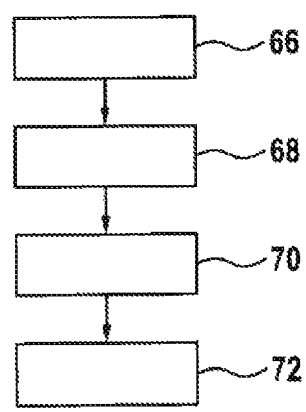
FIG. 8 illustrates a schematic flow diagram of a method for operation of the hand-held tool system.

FIG. 8 shows a flow diagram of a method for operating the hand-held tool system 10. The method for operating the hand-held tool system 10 is effected substantially prior to an actual operation of the hand-held power tool 18, 18', 18".

In the method, in a first step 66 the mobile sensor device 12 is coupled to one of the function devices 20, 22, depending on an operating state. If an application is effected in a clean room, for example, it is possible to use only the simple function device 22. If work is performed in a humid or dirty environment, for example, the alternative function device 20 is preferably used. If work is performed only for a short period, the mobile sensor device 12 may be disposed in the receiving region 46, 46', 46" of the hand-held power tool 18, 18', 18". Then, in a further step 68, optional sensor units 38, 42 may be inserted in the receiving region 36 of the function device 22 or in the receiving region 40 of the mobile sensor device 12, depending on an application. If particular sensors are required for an operation, these can be retrofitted in the form of the optional sensor units 38, 42. After this, in a further step 70, differing settings are stored on the mobile sensor device 12, depending on a field of application. Settings that are appropriate for a field of application and for the hand-held power tool 18, 18', 18" are stored on the mobile sensor device 12 and implemented. The settings in this case are stored automatically on the mobile sensor device 12 by the hand-held power tool 18, 18', 18" by means of pairing. Then, in a further step 72, the hand-held tool system 10 can be fastened to the arm of the operator 32, and normal operation of the hand-held power tool 18, 18', 18" can be started.

During the normal operation of the hand-held power tool 18, 18', 18", a computing unit of the hand-held power tool 18, 18', 18" compares measurement data of sensors of the hand-held power tool 18, 18', 18" and of the mobile sensor device 12. For this purpose, the measurement data of the mobile sensor device 12 are transmitted, by means of the communication unit 16 of the mobile sensor device 12, to that of the hand-held power tool 18, 18', 18", and then to the computing unit. In addition, the measurement data of the sensors of the hand-held power tool 18, 18', 18" are likewise transmitted to the computing unit. During operation, it is additionally checked by the computing unit whether the measurement data exceeds predefined threshold values or whether the measurement data of the sensors of the hand-held power tool 18, 18', 18" matches the measurement data of the mobile sensor device 12. If the threshold values are exceeded, or if the measurement data does not match, the safety settings of the hand-held power tool 18, 18', 18" are adjusted depending on the measurement data of the sensors of the hand-held power tool 18, 18', 18" and of the mobile sensor device 12. In this case, for example, the sensitivity for sensing of a kickback is increased, a maximum torque is reduced, and/or a maximum rotational speed is reduced.

What is claimed is:

1. A hand-held tool system comprising:
    a mobile sensor device having at least one base unit and at least one communication unit configured to communicate with a hand-held power tool; and
    at least one function device configured to be detachably connected to the mobile sensor device, the at least one function device including at least one fastening unit that includes an arm-band configured to fasten the mobile sensor device around an arm of the operator, the arm including a wrist, of an operator, the fastening unit further comprising:
        a first receiving region configured to at least partly encompass the mobile sensor device to enable the detachable connection of the mobile sensor device to the at least one function device, the first receiving region being in a portion of the arm-band configured to position the mobile sensor device on a first side of the arm of the operator wearing the arm-band; and
        a second receiving region in another portion of the arm-band that is separate and spaced apart from the first receiving region, the second receiving region being configured to at least partly encompass a sensor unit that is coupled to the mobile sensor device to provide expanded functionality to the mobile sensor device, the sensor unit detachably connected to the fastening unit by the second receiving region the second receiving region being configured to position the sensor unit on a second side of the arm of the operator wearing the arm-band, wherein the first receiving region on the first side of the arm is opposite the second receiving region on the second side of the arm.

2. The hand-held tool system according to claim 1, wherein the first receiving region is configured as a housing unit configured to accommodate the mobile sensor device.

3. The hand-held tool system according to claim 1, wherein the first receiving region includes an at least partly elastic member defining a cavity configured to receive the mobile sensor device.

* * * * *